(12) United States Patent
Bisht et al.

(10) Patent No.: US 11,777,236 B2
(45) Date of Patent: Oct. 3, 2023

(54) DISTRIBUTION BLOCK

(71) Applicants: TE Connectivity India Private Limited, Bangalore (IN); Tyco Electronics France SAS, Pontoise (FR)

(72) Inventors: Saurabh Bisht, Bangalore (IN); Charlotte Deligny, Pontoise (FR); Philippe France, Pontoise (FR); Dhanabal R, Bangalore (IN); Anna-Line Escoffier, Pontoise (FR)

(73) Assignees: Tyco Electronics France SAS, Pontoise (FR); TE Connectivity India Private Limited, Bangalore (IN)

( * ) Notice: Subject to any disclaimer, the term of this patent is extended or adjusted under 35 U.S.C. 154(b) by 162 days.

(21) Appl. No.: 17/510,860

(22) Filed: Oct. 26, 2021

(65) Prior Publication Data
US 2022/0140503 A1    May 5, 2022

(30) Foreign Application Priority Data

Oct. 30, 2020  (EP) ..................................... 20306299

(51) Int. Cl.
*H01R 9/00*   (2006.01)
*H01R 9/26*   (2006.01)
*H01R 9/24*   (2006.01)
*H02G 3/08*   (2006.01)

(52) U.S. Cl.
CPC ......... *H01R 9/2608* (2013.01); *H01R 9/2491* (2013.01); *H02G 3/08* (2013.01)

(58) Field of Classification Search
CPC .... H01R 9/2608; H01R 9/2491; H01R 25/14; H02G 3/08; H02G 5/08
See application file for complete search history.

(56) References Cited

U.S. PATENT DOCUMENTS

| | | | |
|---|---|---|---|
| 4,111,517 A | 9/1978 | Debaigt | |
| 6,431,880 B1 | 8/2002 | Davis et al. | |
| 7,396,262 B2 | 7/2008 | Korczynski et al. | |
| 9,303,811 B1 | 4/2016 | Lutz, Jr. | |
| 9,837,235 B2 * | 12/2017 | Darr | H01H 85/153 |
| 9,845,942 B2 * | 12/2017 | Ladstaetter | H01R 25/142 |

(Continued)

FOREIGN PATENT DOCUMENTS

| | | |
|---|---|---|
| DE | 20 2010 005215 U1 | 7/2010 |
| EP | 2 783 422 B1 | 1/2019 |

OTHER PUBLICATIONS

European Search Repor and Written Opinion, App. No. 20 30 6299, dated Mar. 18, 2021, 7 pages.
Abstract of WO2011128307, dated Oct. 20, 2011, 1 page.

*Primary Examiner* — Phuong Chi Thi Nguyen
(74) *Attorney, Agent, or Firm* — Barley Snyder

(57) ABSTRACT

A distribution block for attaching to a support rail extending in a support direction comprises an insulating housing, and a conductive member arranged in the insulating housing. A mounting assembly of the distribution block is connected to the insulating housing for attaching to the support rail. The distribution block is mountable on the support rail in a longitudinal configuration wherein the extension direction of the insulating housing is substantially parallel to the support direction, and in a transverse configuration wherein the extension direction of the insulating housing is transverse to the support direction.

20 Claims, 4 Drawing Sheets

(56) References Cited

U.S. PATENT DOCUMENTS

| | | | |
|---|---|---|---|
| 10,263,399 B2* | 4/2019 | Böcker | H02B 1/052 |
| 10,490,927 B2* | 11/2019 | Lin | H01R 13/428 |
| 10,499,518 B2* | 12/2019 | Zhong | H02B 1/0526 |
| 10,622,177 B2* | 4/2020 | Roth | H01R 9/2608 |
| 11,355,868 B2* | 6/2022 | Zhang | H01R 9/16 |
| 11,463,083 B2* | 10/2022 | Ricart | H03K 17/687 |

* cited by examiner

DISTRIBUTION BLOCK

CROSS-REFERENCE TO RELATED APPLICATIONS

This application claims the benefit of European Patent Application No. 20306299.7 filed on Oct. 30, 2020, the whole disclosure of which is incorporated herein by reference.

FIELD OF THE INVENTION

The present invention relates to a distribution block, and more particularly, to a distribution block for mounting to a support rail.

BACKGROUND

In the prior art, it is known to have a distribution block that can be fixed on a support rail, such as a DIN rail. For this purpose, the distribution block includes a snap-fit device as an integrated part of the distribution block. In other embodiments, the distribution block is configured to cooperate with an accessory used as an intermediate connecting part. A drawback of these arrangements includes that the distribution block cooperates according to a fixed orientation with the support rail. This constraint does not facilitate the installation of the distribution block in an installation comprising several electrical devices mounted on the same support rail, as each block is only mountable in one orientation. This is often the case when implementing several devices within, for example, an electrical cabinet.

One solution to the above-problem is to have different distribution blocks including different snap-fit devices, or snap-fit devices oriented in a distinct manner between the different blocks. It is also possible to have different accessories that can be used according to the needed spatial configuration in the electrical cabinet. However, these solutions require the design and production of several different parts, as well as more complicated assembly of these parts into a desired configuration.

Accordingly, improved solutions addressing some or all of the above-mentioned disadvantages are desired.

SUMMARY

According to an embodiment of the present disclosure, a distribution block for attaching to a support rail extending in a support direction comprises an insulating housing, and a conductive member arranged in the insulating housing. A mounting assembly of the distribution block is connected to the insulating housing for attaching to the support rail. The distribution block is mountable on the support rail in a longitudinal configuration wherein the extension direction of the insulating housing is substantially parallel to the support direction, and in a transverse configuration wherein the extension direction of the insulating housing is transverse to the support direction.

BRIEF DESCRIPTION OF THE DRAWINGS

The invention will now be described by way of example with reference to the accompanying Figures, of which.

DETAILED DESCRIPTION OF THE EMBODIMENTS

Figure 1:
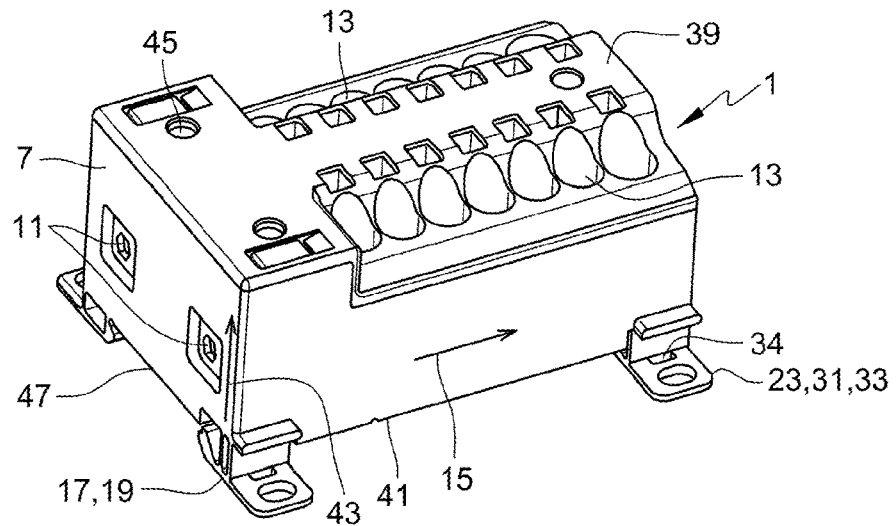
FIG. 1 is a perspective view of a distribution block.
Figure 2:
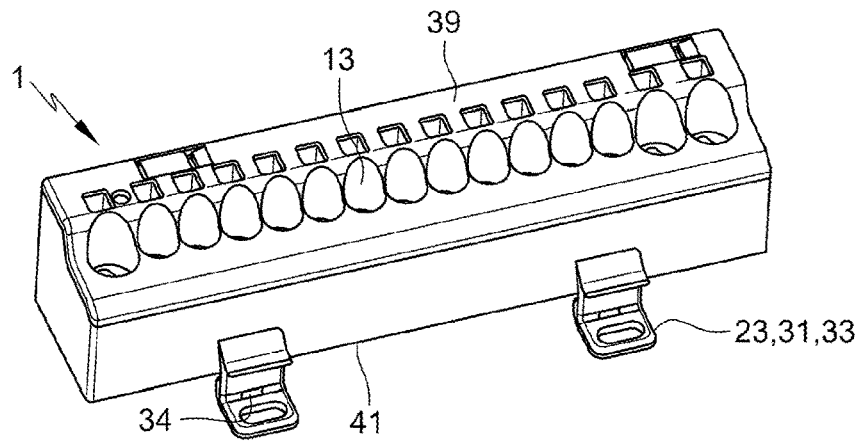
FIGS. 2-6 are perspective views of variants of the distribution block.
Figure 3:
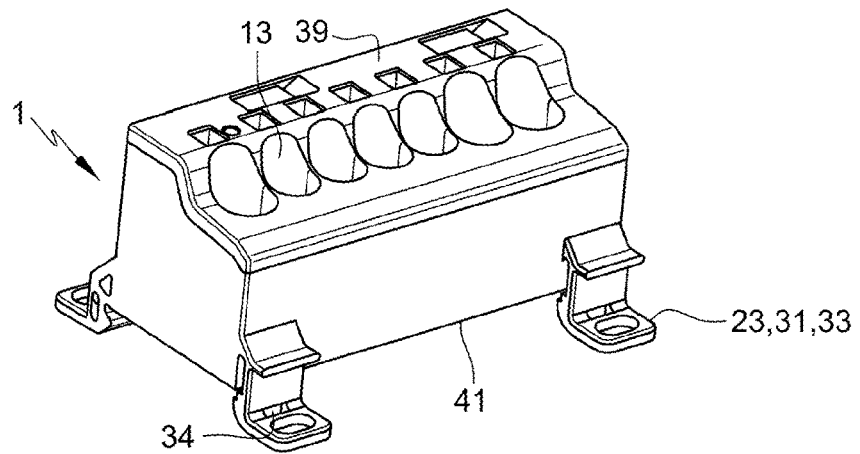
Figure 4:
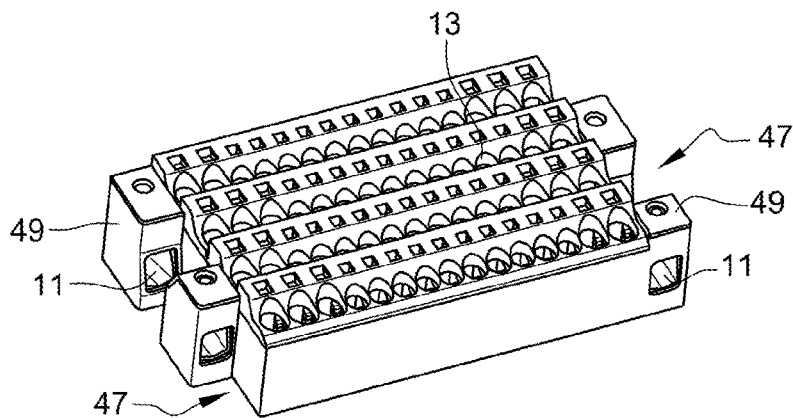
Figure 5:
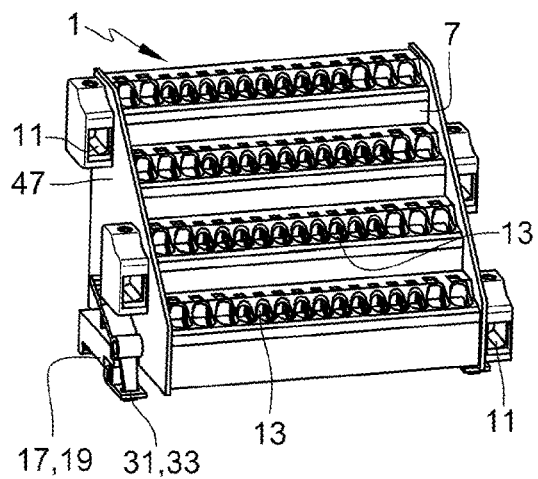
Figure 6:
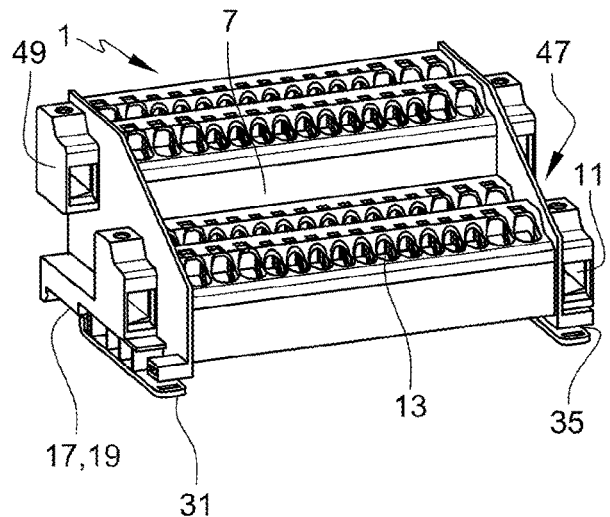

Exemplary embodiments of the present disclosure will be described hereinafter in detail with reference to the attached drawings, wherein the like reference numerals refer to the like elements. The present disclosure may, however, be embodied in many different forms and should not be construed as being limited to the embodiment set forth herein; rather, these embodiments are provided so that the present disclosure will be thorough and complete, and will fully convey the concept of the disclosure to those skilled in the art.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

Figure 11:
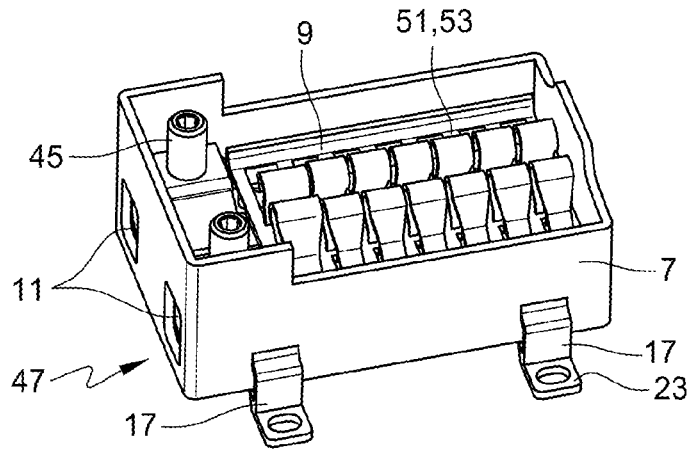
FIG. 11 is an inside view of the distribution block.

As illustrated in FIGS. 1 to 7, a distribution block 1 is configured to cooperate with a support rail 3 extending according to a support direction 5. The distribution block 1 is provided with an insulating housing 7, a conducting entity or conductive member 9 included in the insulating housing 7 as shown in FIG. 11, at least one conductor inlet 11 formed in the insulating housing, and a plurality of conductor outlets 13 formed in the insulating housing and organized in one or several rows. The rows extend substantially parallel to an extension direction 15 of the insulating housing 7.

Figure 7:
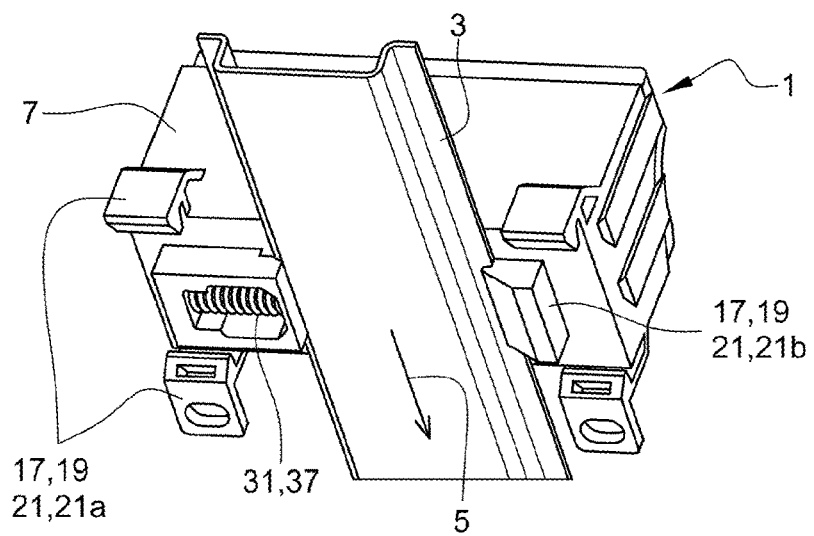
FIG. 7 is a perspective view of a mounting assembly of the distribution block, the distribution block being mounted on a support rail according to a transverse configuration.
Figure 8:
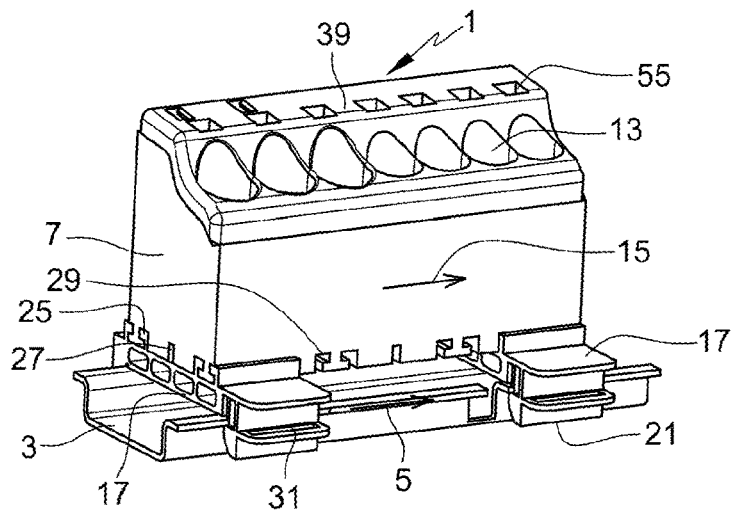
FIG. 8 is a perspective view of a distribution block with a variant of the mounting assembly, the terminal block being mount on the support rail according to a longitudinal configuration.
Figure 9:
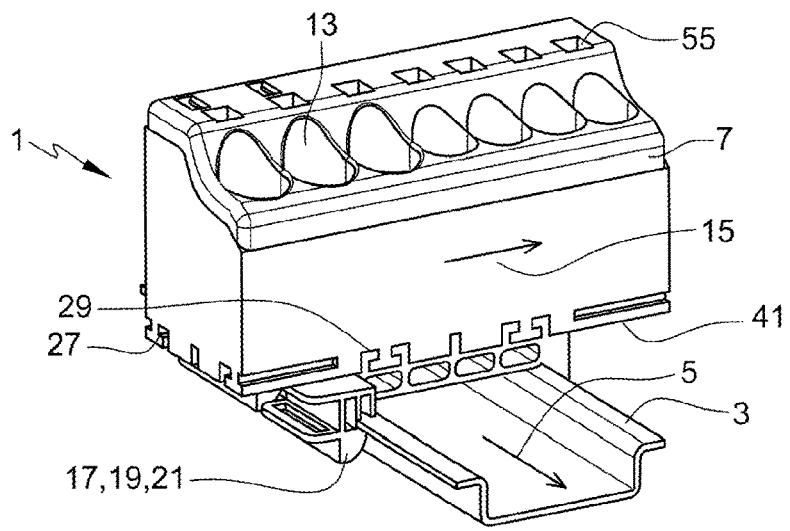
FIG. 9 is a perspective view of the distribution block of FIG. 8 mounted in the transverse configuration.

The distribution block 1 is also provided with a mounting assembly 17 attached on the insulating housing 7 and adapted to cooperate with the support rail 3. The distribution block 1 is adapted to be mounted on the support rail 3 according to a longitudinal configuration wherein the extension direction 15 of the insulating housing 7 is substantially parallel to the support direction 5, as shown in FIG. 8. The distribution block 1 is also adapted to be mounted on the support rail 3 according to a transverse configuration wherein the extension direction 15 of the insulating housing 7 is transverse to the support direction 5 as shown in FIGS. 7 and 9. As can be understood from the figures, the mounting assembly 17 of the distribution block 1 can cooperate with the support rail 3 according to two different configurations. The insulating housing 7 of the distribution block 1 can be oriented according to the support direction 5 or transverse to the support direction.

The mounting assembly 17 comprises a snap-fit device 19 adapted to cooperate with the support rail 3. The snap-fit device 19 comprises a pair of opposed flanges 21 or a plurality of pairs of opposed flanges 21. Each flange 21 of a pair is located on one side of the support rail 3 transversally to the support direction 5 when the snap-fit device 19 cooperates with the support rail. According to the variant of FIGS. 1-7, the mounting assembly 17 is fixed on the insulating housing 7. The snap-fit device 19 comprises a plurality of pairs of opposed flanges 21.

The plurality of pairs of opposed flanges 21 comprises at least one pair of longitudinal opposed flanges 21a configured to cooperate with the support rail 3 in the longitudinal configuration, and at least one pair of transverse opposed flanges 21b configured to cooperate with the support rail in the transverse configuration. In this way, the at least one pair of longitudinal opposed flanges 21a extend according to the extension direction 15 of the insulating housing 7, and the at least one pair of transverse opposed flanges 21b extend transversally. The at least one pair of transverse opposed flanges 21b are located between the at least one pair of longitudinal opposed flanges 21a transversally to the extension direction 15 of the insulating housing 7.

At least one part of the insulating housing 7 and the mounting assembly 17 are realized in one piece which may be formed by, for example, molding. Some of the flanges 21 may be provided with extensions 23 including openings as an alternative fixation means for screws.

Figure 10:
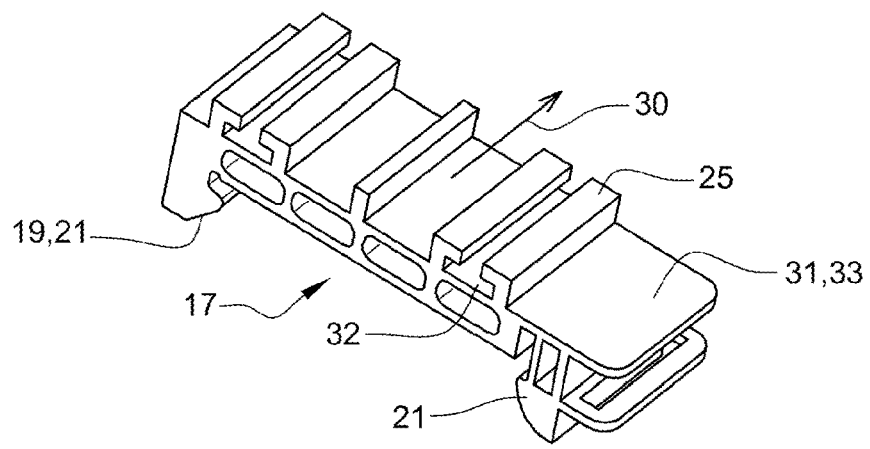
FIG. 10 is a perspective view of the mounting assembly of the distribution block of FIGS. 8 and 9.

According to an embodiment illustrated in FIGS. 8-10, the mounting assembly 17 is configured to be mounted on the insulating housing 7 in a longitudinal position when in the longitudinal configuration and in transverse position when in the transverse configuration. The mounting assembly 17 is provided with ribs and/or grooves 25 configured to cooperate with complementary longitudinal grooves and/or ribs 27 of the insulating housing 7 in the longitudinal position or configuration, and configured to cooperate with complementary transverse grooves and/or ribs 29 of the insulating housing 7 in the transverse position or configuration. The ribs and/or grooves 25 of the mounting assembly 17 define at least one right angle corner. The ribs and/or grooves 25 are profiled and extend according to a mounting direction 30. The right angle corner is defined by a profile of a rib of the ribs and/or grooves 25. The ribs and/or grooves 25 are shaped to define inverted T-shaped profiled recesses 32 extending according to the mounting direction 30 and configured to cooperate with a complementary construction of the insulating housing 7.

The mounting assembly 17 comprises several distinct parts. In particular, the mounting assembly 17 comprises two parts. The several distinct parts are profiled parts as disclosed in FIG. 10.

For all the variants as illustrated in FIGS. 1-10, the mounting assembly 17 comprises a release mechanism 31 configured to disengage the snap-fit device 19. The mounting assembly can include several release mechanisms 31. The release mechanism 31 comprises a biasing element 33 configured to displace at least one part of a flange 21. The biasing element 33 comprises a lever configured to be displaced by hand and/or by a tool to be inserted in a dedicated housing 34. For example, the lever comprises a slit 35 for the insertion of a tool, such as a screwdriver. According to another possibility, the biasing element 33 includes a counter spring 37 configured to maintain the at least one part of the flange 21 in cooperation with the support rail 3.

The insulating housing 7 includes a plugging side 39 on which the plurality of conductor outlets 13 are located, and a connecting side 41 on which the mounting assembly 17 is attached. The plugging side 39 and the connecting side 41 are opposed according to a normal direction 43 of the insulating housing 7 that is substantially perpendicular to the extension direction 15 of the insulating housing. The mounting assembly 17 is located between the connecting side 41 and the support rail 3 when the distribution block 1 cooperates with the support rail 3.

As also shown in FIGS. 11-15, the distribution block 1 comprises an inlet screw mechanism or clamp mechanism 45 configured to connect a conductor installed in the at least one conductor inlet 11. According to one embodiment, the distribution block 1 comprises one conductor inlet 11 and the inlet screw mechanism 45 comprises one screw accessible from the outside of the insulating housing 7. According to another embodiment, the distribution block 1 comprises two conductor inlets 11 and the inlet screw mechanism 45 comprises two corresponding screws accessible from the outside of the insulating housing 7. The at least one conductor inlet 11 is located on an end side 47 of the insulating housing 7, the end side extending transversally to the extension direction 15 of the insulating housing. The at least one conductor inlet insertion direction is substantially perpendicular to each insertion direction of the plurality of conductor inlets.

According to a first embodiment, the at least one conductor inlet insertion direction is substantially orthogonal to the extension plane of the end side 47. According to a second embodiment, the at least one conductor inlet insertion direction is substantially longitudinal to the extension plane of the end side 47. In this case, the insulating housing 7 comprises a corresponding inlet casing 49 extending from the extension plane of the end side 47.

As shown in FIGS. 11-15, the distribution block 1 comprises a push-in mechanism 51 including a leaf spring 53 for each conductor outlet 13. The insulating housing 7 having, for each conductor outlet 13, an actuating opening 55 for displacing said leaf spring 53 as shown in FIGS. 8 and 9. At least a portion of the plurality of conductor outlets 13 and corresponding leaf springs 53 have different sizes adapted to receive different sized conductors. For example, a first group of conductor outlets 13 is adapted to or sized for a first conductor size, and a second group of conductor outlets 13 is adapted to a second conductor size that is bigger than the first conductor size.

Figure 12:
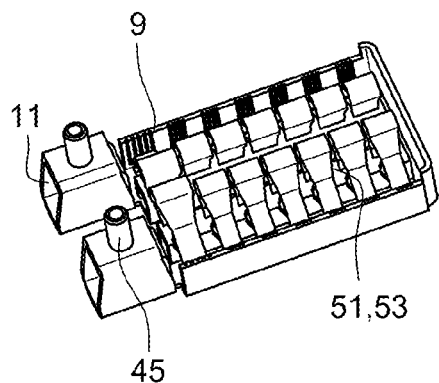
FIGS. 12-15 are perspective views of variants of a conductive entity or conductive member of the distribution block.
Figure 13:
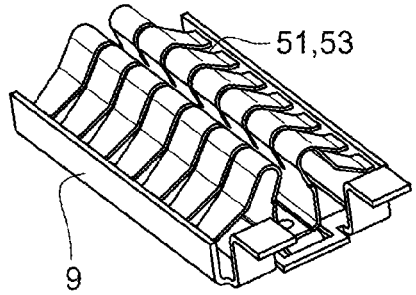
Figure 14:
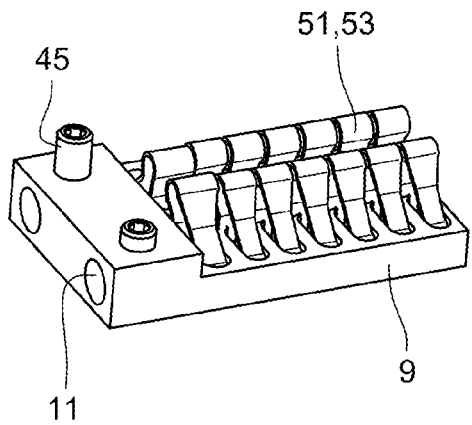
Figure 15:
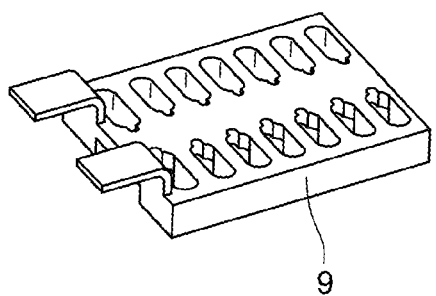

As shown in FIG. 13, the leaf springs 53 of the push-in mechanism 51 can be realized in one piece. According to another embodiment, the conductive entity 9 and leaf springs 53 can constitute a single piece formed of brass. According to another embodiment, the leaf springs 53 can be independent springs configured to cooperate with the conductive entity 9, as shown in FIGS. 12 and 14. The conductive entity 9 may comprise a metal sheet that is cut and folded as shown in FIGS. 12 and 13, or a machined metal block as shown in FIGS. 13 and 15.

The different embodiments of the distribution block 1 can be installed on the support rail 3 in two different ways. This simplifies the handling of the distribution blocks 1 in terms of stock and part references. The distribution block 1 can also be displaced when already wired if there is a need for another part to be installed on the support rail 3.

It should be appreciated for those skilled in this art that the above embodiments are intended to be illustrated, and not restrictive. For example, many modifications may be made to the above embodiments by those skilled in this art, and various features described in different embodiments may be freely combined with each other without conflicting in configuration or principle.

Although several exemplary embodiments have been shown and described, it would be appreciated by those skilled in the art that various changes or modifications may be made in these embodiments without departing from the principles and spirit of the disclosure, the scope of which is defined in the claims and their equivalents.

As used herein, an element recited in the singular and proceeded with the word "a" or "an" should be understood as not excluding plural of said elements or steps, unless such exclusion is explicitly stated. Furthermore, references to "one embodiment" of the present disclosure are not intended to be interpreted as excluding the existence of additional embodiments that also incorporate the recited features. Moreover, unless explicitly stated to the contrary, embodiments "comprising" or "having" an element or a plurality of elements having a particular property may include additional such elements not having that property.

What is claimed is:

1. A distribution block for attaching to a support rail extending in a support direction, comprising:
    an insulating housing;
    a conductive member included in the insulating housing;
    at least one conductor inlet formed in the insulating housing;
    a plurality of conductor outlets formed in the insulating housing and arranged in at least one row extending substantially parallel to an extension direction of the insulating housing; and
    a mounting assembly connected to the insulating housing for attaching to the support rail, the distribution block mountable on the support rail in a longitudinal configuration wherein the extension direction of the insulating housing is substantially parallel to the support direction, and in a transverse configuration wherein the extension direction of the insulating housing is transverse to the support direction.

2. The distribution block according to claim 1, wherein the insulating housing includes a plugging side on which the plurality of conductor outlets are located and a connecting side on which the mounting assembly is attached, the plugging side and the connecting side being opposed according to a normal direction of the insulating housing that is substantially perpendicular to the extension direction of the insulating housing.

3. The distribution block according to claim 1, further comprising an inlet screw mechanism for connecting a conductor installed in the at least one conductor inlet.

4. The distribution block according to claim 1, wherein the at least one conductor inlet is located on an end side of the insulating housing, the end side extending transversally to the extension direction of the insulating housing.

5. The distribution block according to claim 1, wherein the conductive member includes a metal sheet that is cut and folded.

6. The distribution block according to claim 1, wherein the mounting assembly comprises a plurality of distinct parts.

7. The distribution block according to claim 1, wherein at least one part of the insulating housing and the mounting assembly are integrally formed.

8. The distribution block according to claim 1, wherein the mounting assembly is mountable on the insulating housing in a longitudinal position when in the longitudinal configuration, and in a transverse position when in the transverse configuration.

9. The distribution block according to claim 8, wherein the mounting assembly incudes at least one of ribs or grooves cooperating with complementary longitudinal grooves or ribs of the insulating housing in the longitudinal position, and cooperating with complementary transverse grooves or ribs of the insulating housing in the transverse position.

10. The distribution block according to claim 1, further comprising a push-in mechanism including a leaf spring for each conductor outlet, the insulating housing having an actuating opening for displacing the leaf spring for each conductor outlet.

11. The distribution block according to claim 10, wherein at least a part of the plurality of conductor outlets and corresponding leaf springs have different sizes adapted to receive different sized conductors.

12. The distribution block according to claim 10, wherein at least a part of the leaf springs of the push-in mechanism are integrally formed.

13. The distribution block according to claim 1, wherein the mounting assembly includes a snap-fit device having at least one pair of opposed flanges for engaging with the support rail.

14. The distribution block according to claim 13, wherein the mounting assembly is fixedly mounted to the insulating housing, and the snap-fit device has a plurality of pairs of opposed flanges including a pair of longitudinal opposed flanges for engaging with the support rail in the longitudinal configuration, and a pair of transverse opposed flanges for engaging with the support rail in the transverse configuration.

15. The distribution block according to claim 14, wherein the a pair of transverse opposed flanges are located between the pair of longitudinal opposed flanges transversally to the extension direction of the insulating housing.

16. The distribution block according to claim 13, wherein the mounting assembly includes a release mechanism for disengaging the snap-fit device.

17. The distribution block according to claim 16, wherein the release mechanism includes a biasing element for displacing at least one part of a flange, the biasing element having a lever displaceable by hand or by a tool.

18. A distribution block for attaching to a support rail extending in a support direction, comprising:
    an insulating housing;
    a conductive member arranged in the insulating housing; and
    a mounting assembly connected to the insulating housing for attaching to the support rail, the distribution block mountable on the support rail in a longitudinal configuration wherein the extension direction of the insulating housing is substantially parallel to the support direction and in a transverse configuration wherein the extension direction of the insulating housing is transverse to the support direction.

19. The distribution block according to claim 18, wherein the mounting assembly includes a snap-fit device having at least one pair of opposed flanges for engaging with the support rail.

20. The distribution block according to claim 19, wherein the mounting assembly is fixedly mounted to the insulating housing, and the snap-fit device has a plurality of pairs of opposed flanges including a pair of longitudinal opposed flanges for engaging with the support rail in the longitudinal configuration, and a pair of transverse opposed flanges for engaging with the support rail in the transverse configuration.

* * * * *